United States Patent
Sato et al.

(10) Patent No.: US 11,899,856 B2
(45) Date of Patent: Feb. 13, 2024

(54) ELECTRONIC PEN STYLUS

(71) Applicant: Wacom Co., Ltd., Saitama (JP)

(72) Inventors: Yuta Sato, Saitama (JP); Tomohiro Kamai, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/865,190

(22) Filed: Jul. 14, 2022

(65) Prior Publication Data

US 2022/0350428 A1    Nov. 3, 2022

Related U.S. Application Data

(63) Continuation of application No. PCT/JP2021/003508, filed on Feb. 1, 2021.

(30) Foreign Application Priority Data

Feb. 7, 2020 (JP) .................................. 2020-019896

(51) Int. Cl.
*G06F 3/0354* (2013.01)

(52) U.S. Cl.
CPC ................................ *G06F 3/03545* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 2013/0234999 | A1* | 9/2013 | Kuno | G06F 3/03545 345/179 |
| 2017/0068342 | A1* | 3/2017 | Zimmerman | G06F 3/0416 |
| 2018/0052535 | A1* | 2/2018 | Sakuishi | G06F 3/03546 |

FOREIGN PATENT DOCUMENTS

| | | |
|---|---|---|
| JP | 2013-186803 A | 9/2013 |
| JP | 2014-112355 A | 6/2014 |
| JP | 6405495 B2 | 10/2018 |

OTHER PUBLICATIONS

International Search Report, dated Apr. 13, 2021, for International Application No. PCT/JP2021/003508. (5 pages with English translation).

\* cited by examiner

*Primary Examiner* — Peter D McLoone
(74) *Attorney, Agent, or Firm* — Seed IP Law Group LLP

(57) ABSTRACT

Provided is an electronic pen stylus including a front-end part which, in operation, comes into contact with a position pointing input surface, and a rod-shaped axial center part formed integrally with the front-end part, in which at least the front-end part is made of a filler-mixed resin of which a base resin is mixed with a fibrous material as the filler having a hardness that is higher than a hardness of the base resin.

8 Claims, 4 Drawing Sheets

ELECTRONIC PEN STYLUS

BACKGROUND

Technical Field

The present disclosure relates to an electronic pen stylus used advantageously as a stylus of an electronic pen operated by an electromagnetic induction method, for example.

Background Art

Recent years have seen increasing acceptance of computer graphics (CG) and digital paintings. The devices used to input such productions are primarily computers and pen tablets that use a coordinate input apparatus. The coordinate input apparatus includes a position detection apparatus and an electronic pen, the position detection apparatus having a position detection sensor, the electronic pen interacting with the position detection sensor by signals.

The position detection sensor of the position detection apparatus is arranged on the underside (back side) of a computer display screen or of a plate-like input surface of a pen tablet. A user making use of the electronic pen performs handwriting (rendering) input operations on the computer display screen or on the plate-like input surface of the pen tablet serving as a position pointing input surface corresponding to a position detection area of the position detection sensor. By using the position detection sensor, the position detection apparatus detects the coordinates of positions that are pointed by the pen tip of the electronic pen. The computer or the pen tablet causes its display screen to display a rendering trajectory as a continuation of the coordinates of the pointed positions that have been detected.

For the handwriting (rendering) input operation with the electronic pen, it has been a major challenge to reproduce a writing feeling evocative of writing with a pencil on paper. With the electronic pen, a front-end part of the electronic pen stylus is projected as a pen tip, outside of the pen housing. The user brings the projected front-end part of the electronic pen stylus into contact with the pointing input surface such as the display screen of the computer or the plate-like input surface of the pen tablet and performs position pointing input.

The writing feel of the electronic pen is determined by the material of the electronic pen stylus as well as the material of the position pointing input surface. In this case, it is understood that, in order to obtain the writing feeling similar to that of the combination of paper and pencil, there needs to be a certain level of friction between the electronic pen stylus and the position pointing input surface.

In relation to the position pointing input surface, a proposal for better writing feeling (see Japanese Patent No. 6405495) involves pasting a surface sheet onto the display screen or like component in order to generate friction between the electronic pen stylus and the sheet and to thereby reproduce a desired writing feeling.

Meanwhile, diverse materials have been used in manufacturing the electronic pen stylus. It has been found that metallic styluses are too hard and the elastomer styluses are too soft to obtain such writing feeling as that of the combination of paper and pencil. It is hence considered optimal to use resin with suitable hardness and elasticity for acquiring the writing feel similar to that of the combination of paper and pencil.

Experience has exhibited that writing on a rough surface sheet with an electronic pen stylus made of resin scrapes the resin by friction and produces a scraping feel evocative of the writing feeling. The writing feeling similar to that of the combination of paper and pencil can be reproduced by the electronic pen stylus soft enough to be scraped off by friction on the surface sheet.

However, having the electronic pen stylus scraped off by friction on the surface sheet of the position pointing input surface signifies that the electronic pen stylus gets worn away by abrasion. The problem is that a higher rate of wear of the electronic pen stylus requires the user of the electronic pen to replace its stylus frequently.

BRIEF SUMMARY

The present disclosure has been made in view of the above circumstances. An object of the disclosure is therefore to provide an electronic pen stylus configured to offer a desired writing feel while reducing stylus wear at the same time.

In solving the above problem, there is provided an electronic pen stylus including a front-end part which, in operation, comes into contact with a position pointing input surface and a rod-shaped axial center part formed integrally with the front-end part. At least the front-end part is made of a filler-mixed resin of which a base resin is mixed with a fibrous material as a filler having a hardness that is higher than a hardness the base resin.

At least the front-end part of the electronic pen stylus configured as described above is made of the filler-mixed resin of which the base resin is mixed with the fibrous material as the filler having the hardness that is higher than the hardness of the base resin. For this reason, the front-end part of the electronic pen stylus has higher wear resistance than in the case where the front-end part is composed of the base resin alone. The electronic pen stylus of the above configuration thus readily provides a desired writing feeling while ensuring high wear resistance.

DETAILED DESCRIPTION

A preferred embodiment of the electronic pen stylus according to the present disclosure is described below with reference to the accompanying drawings. The electronic pen stylus to be explained hereunder is used as the stylus of an electronic pen for use with a coordinate input apparatus operated by the electromagnetic induction method.

Prior to the explanation on the preferred embodiment of the electronic pen stylus of this disclosure, the coordinate input apparatus operated by the electromagnetic induction method is outlined below.

The coordinate input apparatus operated by the electromagnetic induction method includes a position detection apparatus and an electronic pen. The position detection apparatus includes a position detection sensor having numerous loop coils arranged in X and Y coordinate axes. The electronic pen includes a resonance circuit including capacitors and a coil as a typical inductance element wound around a magnetic core.

The position detection apparatus supplies a transmission signal of a predetermined frequency to the loop coils of the position detection sensor, sending the signal as electromagnetic energy to the electronic pen. The resonance circuit in the electronic pen is configured to have a resonance frequency corresponding to the frequency of the transmission signal. The resonance circuit of the electronic pen accumulates electromagnetic energy therein, according to electromagnetic induction relative to the loop coils in the position detection sensor. The electronic pen returns the electromagnetic energy accumulated in the resonance circuit to the loop coils in the position detection sensor.

The loop coils in the position detection sensor detect the electromagnetic energy coming from the electronic pen. The position detection apparatus detects the coordinates in X and Y axes of the positions pointed by the electronic pen on the position detection sensor, according to the positions of the loop coils supplying the transmission signal and the positions of the loop coils detecting the electromagnetic energy from the resonance circuit in the electronic pen.

Figure 1:
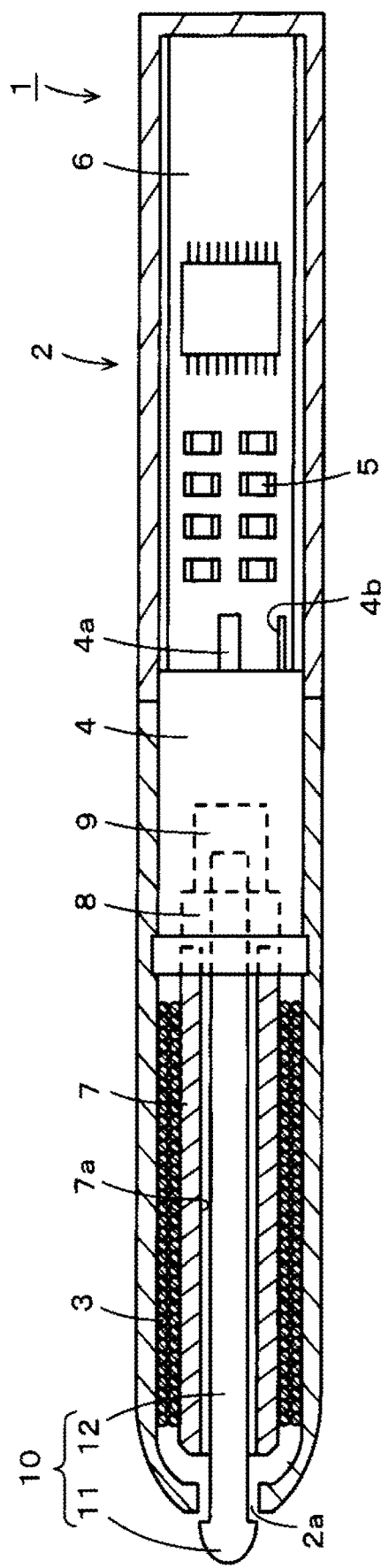
FIG. 1 is a diagram depicting an exemplary configuration of an electronic pen equipped with an electronic pen stylus embodying the present disclosure.

FIG. 1 depicts an exemplary overall configuration of an electronic pen 1 of this type. A case (housing) 2 of the electronic pen 1 has a cylindrical shape. A hollow space in the case 2 accommodates a coil 3 for position detection, a writing pressure detection part 4, and a printed-circuit board 6 carrying capacitors 5 and other electronic parts that constitute the resonance circuit together with the coil 3, all the parts being arranged successively in an axial direction.

The coil 3 is wound around a ferrite core 7 as a typical cylindrical magnetic core having a through-hole 7a in the axial direction. The ferrite core 7 with the coil 3 wound around it is placed in the case 2 near an opening 2a on the pen tip side. The writing pressure detection part 4 is placed on the opposite side of the ferrite core 7 with a buffer material 8 interposed therebetween away from the opening 2a of the case 2. The writing pressure detection part 4 has a stylus holder 9.

A stylus 10 constituting an embodiment of the electronic pen stylus includes a front-end part 11 that makes up a pen tip and that is formed integrally with an axial center part 12. In this example, the front-end part 11 of the stylus 10 has a cylindrical shape with a circular cross section. The front-end part 11 is configured in such a manner that its tip surface coming into contact with the pointing input surface has a hemispherically curved surface intended to provide a constant writing feel when the user tilts or rotates the electronic pen 1 while pointing positions on the pointing input surface. Also, the axial center part 12 of the stylus 10 in this example has a rod-like shape with a circular cross section. In this example, the diameter of the cross section of the axial center part 12 is made smaller than that of the cross section of the front-end part 11.

The stylus 10 is inserted into the case 2 from the side of the axial center part 12 through the opening 2a to penetrate the through-hole 7a of the ferrite core 7. An end of the axial center part 12 of the stylus 10 is fitted into the stylus holder 9 in the writing pressure detection part 4 and held therein. In this case, the stylus 10 is detachably retained in the stylus holder 9. When the end of the axial center part 12 is fitted in the stylus holder 9, the front-end part 11 of the stylus 10 is projected out of the opening 2a of the case 2, as depicted in FIG. 1.

In the electronic pen 1 of this example, the writing pressure detection part 4 is configured as a variable capacitance capacitor arrangement that detects the pressure (writing pressure) applied to the front-end part 11 of the stylus 10 as changes in capacitance. The writing pressure detection part 4 is electrically connected to the printed-circuit board 6 by way of its terminals 4a and 4b. The writing pressure detection part 4, the coil 3, and the capacitors 5 combine to constitute the resonance circuit.

As mentioned above, the coordinate input apparatus has its position pointing input surface for the electronic pen 1 formed in a manner coinciding with the position detection area of the position detection sensor. The user brings the tip of the stylus 10 of the electronic pen 1 into contact with the position pointing input surface to perform position pointing input, i.e., handwriting input or rendering input. The electronic pen 1 exchanges electromagnetic waves with the position detection sensor by using the resonance circuit.

That is, the electronic pen 1 with its resonance circuit receives a signal from the position detection sensor in the position detection apparatus, and, by feeding the signal back to the position detection apparatus, points a position on the apparatus. By monitoring the signal received by the loop coils, the position detection apparatus detects the position of the position detection sensor at which the feedback signal from the electronic pen 1 is received. In so doing, the position detection apparatus detects the coordinates of the position pointed by the electronic pen 1.

When a pressure (writing pressure) is applied to the stylus 10, the writing pressure detection part 4 in the electronic pen 1 has its capacitor capacitance changed, which in turn causes the resonance frequency to change. By detecting the change in the resonance frequency, the position detection apparatus detects the pressure (writing pressure) applied to the front-end part 11 of the stylus 10 of the electronic pen 1.

[Exemplary Materials for the Stylus 10 Embodying the Electronic Pen Stylus]

In the electronic pen 1 operated by the electromagnetic induction method as described above, the stylus 10 is usually made of a resin material that provides a desired writing feel. However, the problem is that the stylus formed solely by this type of resin material is worn off in a relatively quick manner by friction with the position pointing input surface, as discussed above.

In view of the above, the stylus 10 of this embodiment is configured to minimize wear while maintaining the desired writing feel. That is, the stylus 10 of this embodiment includes a filler-mixed resin, which is a primary resin (referred to as the base resin hereunder) mixed with a filling material (filler).

The base resin of the stylus 10 offering the desired writing feel needs to be capable of being worn off. For this reason, a resin material that can be worn off by friction with the surface sheet, such as polyacetal (POM), is used as the base resin in this embodiment. Obviously, however, POM is not limitative of the base resins that can be used.

The filler to be mixed with POM as the base resin should preferably meet the conditions explained below. What follows is a more detailed explanation of the conditions to be satisfied by the filler that is to be mixed with the base resin.

<Mechanism of Wear of the Stylus>

Figure 2A:
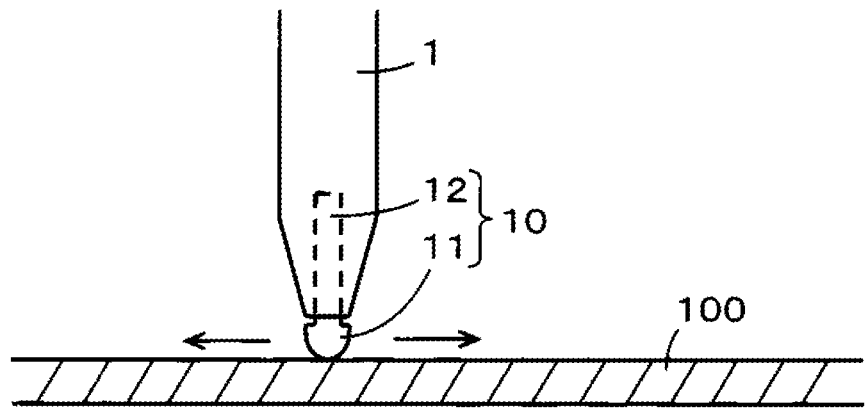
FIGS. 2A to 2C are diagrams explaining the wear of an electronic pen stylus.

As depicted in FIG. 2A, with the front-end part 11 of the stylus 10 in contact with a surface sheet 100 pasted on the position detection sensor at the time of handwriting input or rendering input, the electronic pen 1 is slidably moved along the surface of the surface sheet 100 in the arrowed directions in FIG. 2A. The front-end part 11 of the stylus 10 of the electronic pen 1 is thus worn off by friction with the surface sheet 100. How wear takes place between the front-end part 11 of the stylus 10 and the surface sheet 100 is explained below. In this case, the surface of the surface sheet 100 serves as the position pointing input surface.

Figure 2B:
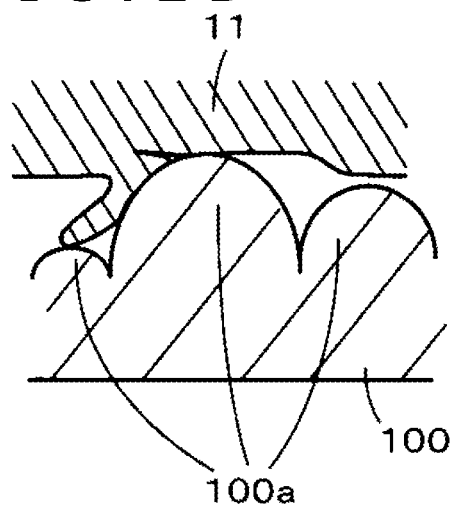
Figure 2C:
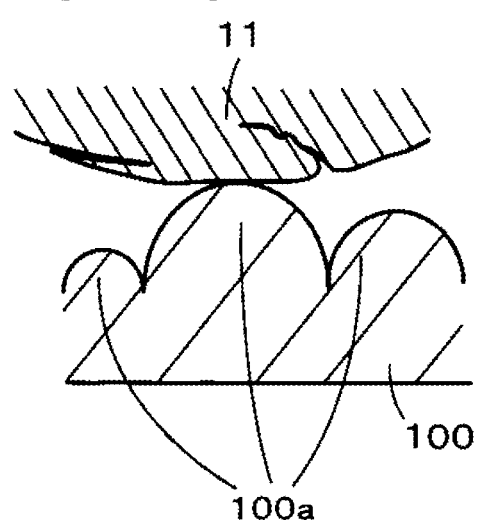

As illustrated in an enlarged manner in FIGS. 2B and 2C, the surface of the surface sheet 100 includes multiple fine protrusions 100a that mimic the rough feel of writing with a pencil on paper during input by the electronic pen 1. The surface of the front-end part 11 of the stylus 10 of the electronic pen 1 comes into contact with the protrusions 100a when the front-end part 11 is moved in the arrowed directions in FIG. 2A. The friction between the surface of the front-end part 11 of the stylus 10 on one hand and the protrusions 100a of the surface sheet 100 on the other hand scrapes off the surface of the front-end part 11 of the stylus 10 of the electronic pen 1 and thereby wears off the front-end part 11 of the stylus 10.

Of the various types of wear, abrasive wear and fatigue wear are relevant as the wear of the electronic pen stylus.

FIG. 2B depicts how abrasive wear takes place. In the case of the front-end part 11 of the stylus 10, as depicted in FIG. 2B, abrasive wear occurs when the surface of the front-end part 11 is partially dug out by the protrusions 100a of the surface sheet 100 serving as the mating material. FIG. 2C depicts how fatigue wear takes place. As depicted in FIG. 2C, fatigue wear occurs when the front-end part 11 of the stylus 10 is degraded by fatigue and thus scraped off by the protrusions 100a of the surface sheet 100 as the mating material.

<Parameters for Improving the Wear Resistance of Resin>

The wear of the stylus 10 in contact with the surface sheet 100 mainly involves abrasive wear. The abrasive wear is defined by the formula below.

The formula is: friction volume=specific wear amount (constant)×load×sliding distance=constant×(friction coefficient/(hardness×tensile fracture strength×tensile fracture elongation))×load×sliding distance     (Formula 1)

From Formula 1 above, the following parameters (factors) related to abrasive wear are derived:
1. The lower the friction, the smaller the amount of wear.
2. The higher the hardness of the material, the smaller the amount of wear.
3. The higher the tensile fracture strength of the material, the smaller the amount of wear.
4. The greater the tensile fracture elongation of the material, the smaller the amount of wear.

Of the above four parameters, the parameter "2. Hardness of material" is deemed especially relevant to abrasive wear. For this reason, the stylus 10 includes a filler-mixed resin mixed with a filler at least higher in hardness than the base resin that is POM in this embodiment.

In this embodiment, the filler is made of a fibrous material that pulls back what is being stripped off by the above-described fatigue wear and abrasive wear from the base resin. This is to minimize the amount of the base resin portion being torn off.

Figure 3A:
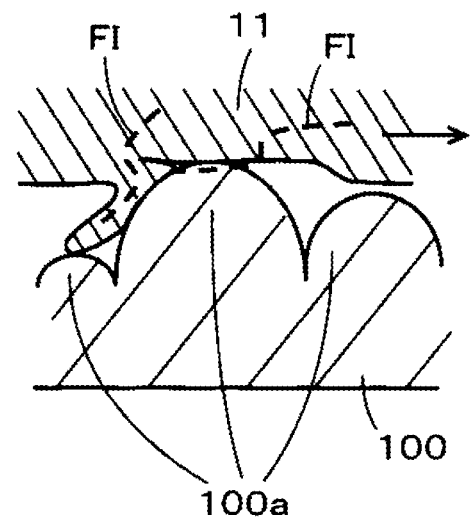
FIGS. 3A and 3B are diagrams explaining how to prevent the wear of one electronic pen stylus embodying the present disclosure.
Figure 3B:
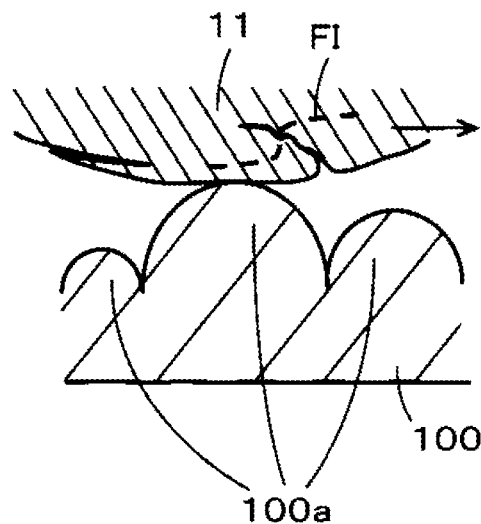

FIGS. 3A and 3B are diagrams explaining how abrasive wear and fatigue wear are minimized by a fibrous material filler mixed with the base resin of the stylus 10.

Specifically, FIGS. 3A and 3B explain abrasive wear and fatigue wear, respectively, with thick broken lines indicating a filler FI made of a fibrous material.

With abrasive wear, as seen in FIG. 3A, the fibrous material filler FI within the base resin pulls back what is being stripped off from the base resin. The surface of the front-end part 11 of the stylus 10 is thus made resistant to being dug out.

With fatigue wear, as seen in FIG. 3B, the fibrous material filler FI tends to retain what is being fractured. This renders the front-end part 11 of the stylus 10 more resistant to fatigue wear.

As explained above, the fibrous material pulls back what is being stripped off from the base resin or retains what is being fractured of the base resin. As a result, the other parameters "3. Tensile fracture strength of the material" and "4. Tensile fracture elongation of the material" above are also considered important. In this embodiment, the fibrous material used as the filler is higher in hardness and in tensile strength than POM, which is a typical base resin.

Exemplary fibrous materials that meet the above conditions include fiber made of resin called Kevlar (registered trademark) constituted by poly-paraphenylene terephthalamide (called the Kevlar fiber hereunder), in addition to carbon fiber and glass fiber. Any of these fibrous materials can be used in the electronic pen stylus of this embodiment.

However, if the point described hereunder is considered, the Kevlar fiber is a more effective choice as the fibrous material to be mixed with the base resin of the electronic pen stylus.

That is, in the case of wear of the front-end part 11 of the stylus 10 made of a filler-mixed resin mixed with a fibrous material as the filler, there is a possibility that the fibrous material can jut out from the surface of the front-end part 11 of the stylus 10. In such a case, a fibrous material with high hardness can damage the surface sheet. Hence, if a high-hardness fibrous material is used as the filler, the surface sheet needs to be still higher in hardness than the fibrous material. This limits the choice of materials for the surface sheet. It thus becomes difficult to constitute a surface sheet offering the desired writing feel in contact with the stylus 10 of the electronic pen 1.

The above-cited exemplary fibrous materials for the filler are listed here in order of decreasing hardness: carbon fiber, glass fiber, Kevlar fiber, and POM (base resin). Of the cited fibrous materials, the Kevlar fiber has the lowest hardness and is flexible. Whereas the surface sheet has diverse properties in terms of hardness and has a pencil hardness level of 3H to 5H, the carbon fiber filler jutting out of the front-end part 11 of the stylus 10 has the pencil hardness level of 9H or higher and will damage the surface sheet. The glass fiber filler, if jutting out of the front-end part 11, has the pencil hardness level of approximately 9H and will also damage the surface sheet. The Kevlar fiber filler jutting out of the front-end part 11 of the stylus 10 has the pencil hardness level of 4H to 5H and does not appreciably damage the surface sheet having the pencil hardness level of 3H to 5H. In this embodiment, the Kevlar fiber is thus used as an optimum fibrous material to be mixed with the base resin for the electronic pen stylus.

[Method of Manufacturing the Stylus 10 as an Exemplary Electronic Pen Stylus Embodying the Disclosure]

In manufacturing the stylus 10, the filler-mixed resin mixed with a fibrous material as the filler is injected into a dedicated mold and cooled. In this case, the fiber length of the fibrous material is set to have such a length as to ensure the fluidity of the filler-mixed resin. That is, if the fiber length of the fibrous material is greater than the cross-sectional diameter of the axial center part 12 of the stylus 10 or the cross-sectional diameter of the front-end part 11, the fibrous material filler lowers the fluidity of the filler-mixed resin and may hamper proper molding of the stylus 10. In this embodiment, the fiber length of the fibrous material is thus made at least less than the cross-sectional diameter of the axial center part 12 of the stylus 10 or of the front-end part 11 thereof.

In this case, the shorter the fiber length of the fibrous material, the higher the fluidity of the filler-mixed resin injected in the mold of the stylus 10. The higher fluidity makes it easier to mold the stylus 10. However, a too short fiber length makes it difficult to obtain the effect of wear resistance with the fibrous material as explained above with reference to FIGS. 3A and 3B; the front-end part 11 of the stylus 10 becomes more vulnerable to wear. On the other hand, a too long fiber length can make it more likely to let the fibrous material jut out of the surface of the front-end part 11 of the stylus 10 when the front-end part 11 is worn off.

In this embodiment, the fiber length of the fibrous material mixed with the base resin is selected to be at least less than the cross-sectional diameter of the axial center part 12 of the stylus 10 or of the front-end part 11 thereof, and, in consideration of the fluidity of the filler-mixed resin, to be long enough to maximally prevent the fibrous material from jutting out of the surface of the front-end part 11 of the stylus 10 when the front-end part 11 is worn off.

In this embodiment, the filler-mixed resin mixed with the fibrous material is injected into the mold not in the direction from the side of the front-end part 11 of the stylus 10 toward the axial center part 12 but in a direction from the side of the axial center part 12 toward the front-end part 11. Further, given the recent trend toward downscaling of the electronic pen as in a case where the axial center part 12 of the stylus 10 has a diameter of as small as 0.5 mm, the filler-mixed resin is injected into the mold from an intermediate position of the axial center part 12.

That is, if the filler-mixed resin is injected axially from the end side of the axial center part 12 of the stylus 10, there is fear that the fibrous material FI as the filler may clog the portion corresponding to the axial center part 12 and fail to reach the portion corresponding to the front-end part 11. In contrast, when injected from an intermediate position corresponding to a midway portion of the axial center part 12, the filler-mixed resin flows in such a manner that the flowing fibrous material reaches the portion corresponding to the front-end part 11 of the stylus 10.

Figure 4:
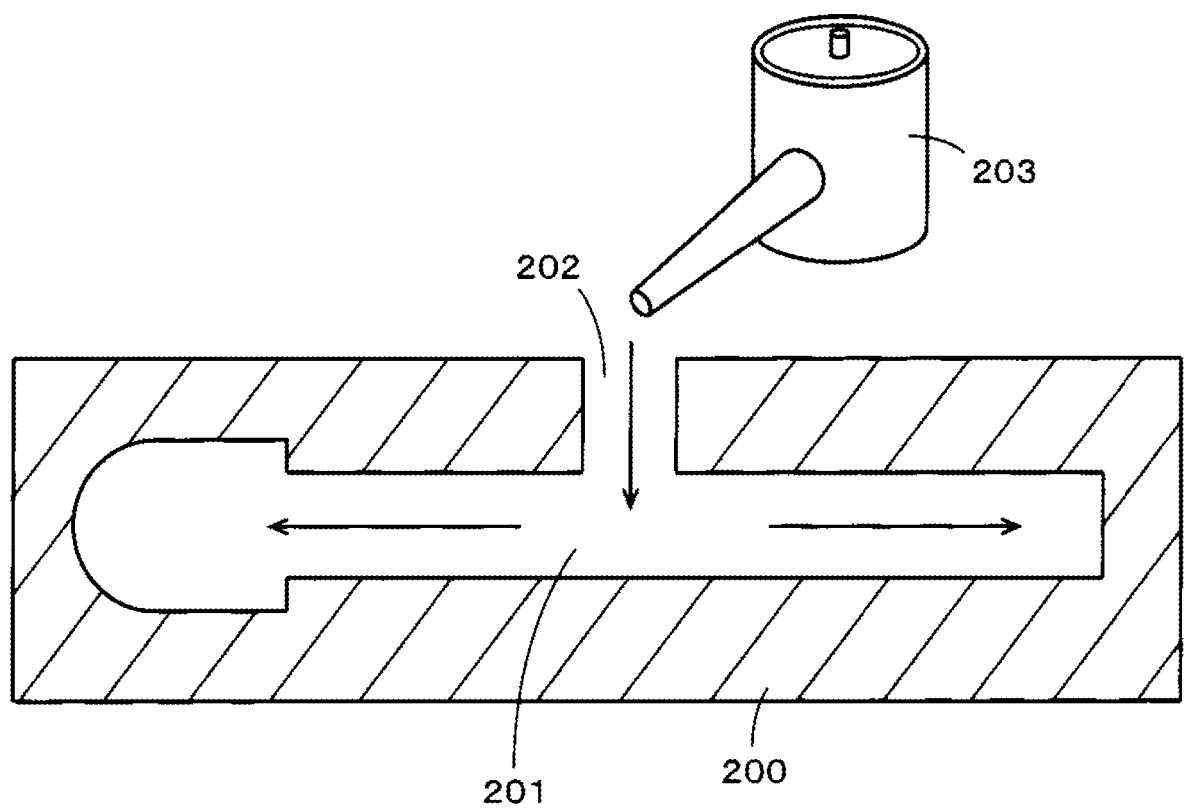
FIG. 4 is a diagram explaining a method of manufacturing one electronic pen stylus embodying the present disclosure.

FIG. 4 outlines a mold for manufacturing the stylus 10 as an exemplary electronic pen stylus of this embodiment, along with the position on the mold from which the resin is to be injected.

As depicted in FIG. 4, a mold 200 has a hollow space 201 shaped corresponding to the front-end part 11 and the axial center part 12 of the stylus 10. On the mold 200, a resin injection port 202 connected to the hollow space 201 therein is formed at an intermediate position corresponding to a midway portion of the axial center part 12 of the stylus 10 in the hollow space 201.

A molten filler-mixed resin mixed with the fibrous material is injected from a resin container 203 through the resin injection port 202 of the mold 200. As indicated by arrows in FIG. 4, the injected resin flows toward the side of the front-end part 11 as well as toward the back-end side of the axial center part 12 to form and manufacture the stylus 10.

Figure 5:
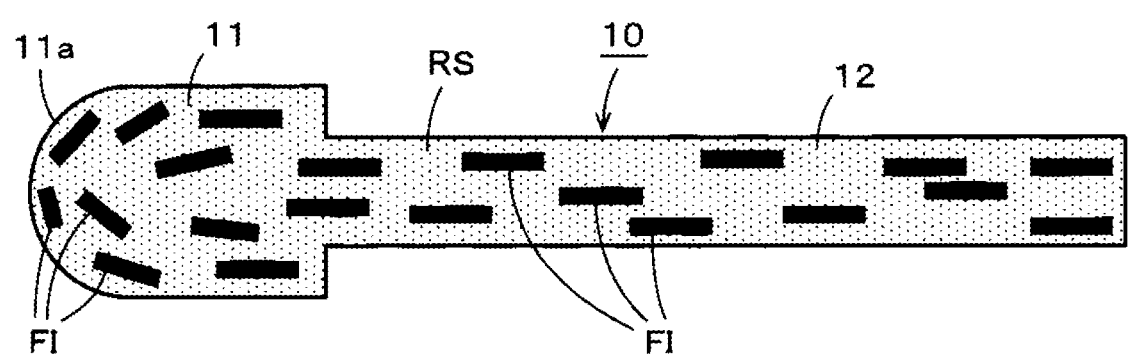
FIG. 5 is a diagram explaining one exemplary electronic pen stylus embodying the present disclosure.

FIG. 5 is a schematic diagram depicting how the fibrous material FI is mixed in a filler-mixed resin RS of the stylus 10 manufactured as described above. That is, since the tip of the front-end part 11 of the stylus 10 has a hemispherical shape as depicted in FIG. 5, the fibrous material FI is positioned along the contour of a tip surface of the front-end part 11 of the stylus 10 (i.e., aslant to the axial direction). This is because the fibrous material FI flows along with the filler-mixed resin RS into the hollow space 201 of the mold 200 and fills up the hollow space 201 together with the filler-mixed resin RS. That is, because the filler-mixed resin RS flows along the curved surface corresponding to the front-end part 11 of the stylus 10 in the hollow space 201 of the mold 200 before filling up the hollow space 201, the fibrous material FI moving with this flow fills up the hollow space 201 in a manner following the curved surface of the portion corresponding to the front-end part 11 of the stylus 10.

For this reason, even when the front-end part 11 of the stylus 10 is worn off, the tip of the fibrous material is maximally prevented from jutting out to damage the surface sheet. In the case where the Kevlar fiber is used as the fibrous material, the relatively soft and highly flexible front-end part is, even if jutting out, further prevented from damaging the surface sheet as discussed above.

In the stylus 10 of this embodiment, the filler-mixed resin RS injected from the resin injection port 202 stops flowing at the front-end part 11 of which the diameter is larger than that of the axial center part 12. As a result, the fibrous material in the front-end part 11 is made higher in density than in the axial center part 12. This increases the wear resistance of the front-end part 11 of the stylus 10.

Also in this embodiment, the front-end part 11 and the axial center part 12 are integrally formed in the stylus 10. The axial center part 12, also formed by the filler-mixed resin mixed with the fibrous material, has its hardness increased, so that it is more resistant to breakage. In the case of a downsized electronic pen stylus, the fibrous material that may be mixed advantageously with the base resin is carbon fiber or glass fiber whose hardness is higher than that of the Kevlar fiber.

Figure 6:
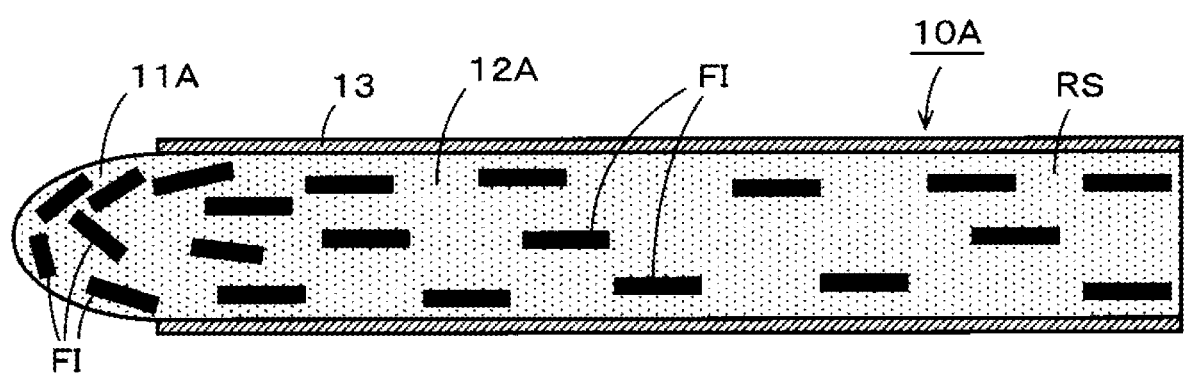
FIG. 6 is a diagram explaining another exemplary electronic pen stylus embodying the present disclosure.

A hard-to-break downsized electronic pen stylus may preferably have its axial center part covered with an outer coat of which the hardness is higher than that of the base resin. FIG. 6 depicts a stylus 10A having an axial center part covered with an outer coat.

That is, the stylus 10A of this example has a rod-like front-end part 11A configured to be circular in cross section and bullet-shaped at one end and to have a predetermined diameter. The stylus 10A is formed, in this example, by the filler-mixed resin RS made of the base resin of POM mixed with the fibrous material FI composed of the Kevlar fiber.

In this example, the axial center part 12A of the stylus 10A is covered with a cylindrical outer coat 13. The cylindrical outer coat 13 of this example is formed by carbon fiber or glass fiber higher in hardness than the base resin of POM. Obviously, the cylindrical outer coat 13 can alternatively be formed by some other suitable material higher in hardness than the base resin of POM.

[Effects of the Electronic Pen Stylus Embodying the Disclosure]

The electronic pen stylus of the above-described embodiment is composed of the filler-mixed resin of which the base resin is capable of being worn off to offer the desired writing feel, the filler-mixed resin being obtained from the base resin being mixed with the fibrous material as the filler higher in hardness than the base resin. The composition makes it possible to obtain the desired writing feel of the electronic pen while reinforcing the strength of the resinous tip of the stylus against wear and thereby improving the wear resistance of the stylus.

OTHER EMBODIMENTS OR ALTERNATIVE EXAMPLES

In the above-described embodiment, both the front-end part and the axial center part of the electronic pen stylus are made of the filler-mixed resin. Alternatively, only the front-end part may be formed by the filler-mixed resin of which the base resin is mixed with the fibrous material.

In the above-described embodiment, the front-end part and the axial center part of the electronic pen stylus are made circular in cross section. However, the cross section of these parts is not limited to be circular. Alternatively, the front-end part and the axial center part may be polygonal in cross section, for example.

Whereas the electronic pen stylus of the above embodiment is for use with the electronic pen operated by the electromagnetic induction method, the stylus may also be used in conjunction with an electronic pen operated by the capacitance method (i.e., active capacitance method). In the latter case, it is to be noted that the base resin for the electronic pen stylus needs to be mixed with an electrically conducting material such as conductive metal powder to make sure that the stylus is electrically conductive.

It is to be noted that the embodiment of the present disclosure is not limited to the foregoing embodiment, and that various changes can be made without departing from the spirit of the present disclosure.

What is claimed is:

1. An electronic pen stylus comprising:
a front-end part which, in operation, comes into contact with a position pointing input surface; and
a rod-shaped axial center part formed integrally with the front-end part,
wherein at least the front-end part is made of a filler-mixed resin of which a base resin is mixed with a fibrous material as a filler having a hardness that is harder than a hardness of the base resin,
wherein both the front-end part and the axial center part are made of the filler-mixed resin,
wherein the fibrous material in the front-end part is higher in density than in the axial center part, and
wherein the axial center part is thinner than the front-end part.

2. The electronic pen stylus according to claim 1, wherein a fiber length of the fibrous material is less than a thickness of the front-end part and a thickness of the axial center part.

3. The electronic pen stylus according to claim 2, wherein a lengthwise direction of the fibrous material in the front-end part is oblique along a contour of a tip surface of the front-end part.

4. The electronic pen stylus according to claim 1, wherein the hardness of the fibrous material is lower than a hardness of glass fiber or carbon fiber.

5. The electronic pen stylus according to claim 4, wherein the fibrous material is poly-paraphenylene terephthalamide fiber.

6. The electronic pen stylus according to claim 1, wherein, in operation, the base resin is worn off by friction between the front-end part and the position pointing input surface.

7. The electronic pen stylus according to claim 1, wherein the fibrous material is made of a material having a tensile strength that is higher than a tensile strength the base resin.

8. The electronic pen stylus according to claim 1, wherein the axial center part is covered with an outer coat made of a material having a hardness that is higher than the hardness of the base resin.

* * * * *